(12) United States Patent
Nishijima

(10) Patent No.: US 8,745,968 B2
(45) Date of Patent: Jun. 10, 2014

(54) ABNORMALITY DETECTION APPARATUS FOR PARTICULATE FILTER

(75) Inventor: Hiroki Nishijima, Suntou-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 249 days.

(21) Appl. No.: 13/499,377

(22) PCT Filed: May 2, 2011

(86) PCT No.: PCT/IB2011/000939
§ 371 (c)(1),
(2), (4) Date: Mar. 30, 2012

(87) PCT Pub. No.: WO2011/144977
PCT Pub. Date: Nov. 24, 2011

(65) Prior Publication Data
US 2012/0180458 A1 Jul. 19, 2012

(30) Foreign Application Priority Data
May 17, 2010 (JP) ................................ 2010-113439

(51) Int. Cl.
*F01N 3/00* (2006.01)

(52) U.S. Cl.
USPC .......................................................... 60/277

(58) Field of Classification Search
USPC .......................................................... 60/277
See application file for complete search history.

(56) References Cited

U.S. PATENT DOCUMENTS

| 2007/0089399 A1* | 4/2007 | Rhodes et al. ................... 60/278 |
| 2009/0301062 A1* | 12/2009 | Sumida et al. ................... 60/285 |
| 2010/0101409 A1* | 4/2010 | Bromberg et al. ................... 95/8 |

FOREIGN PATENT DOCUMENTS

| DE | 101 53 769 A1 | 8/2002 |
| EP | 0 936 349 A2 | 8/1999 |
| EP | 2 116 843 A1 | 11/2009 |
| JP | A-2004-108321 | 4/2004 |
| JP | 2004308454 A * | 11/2004 |
| JP | A-2009-215926 | 9/2009 |
| JP | A-2009-293518 | 12/2009 |
| WO | WO 2010125636 A1 * | 11/2010 |

OTHER PUBLICATIONS

English translation of Japanese Patent Application Publication No. JP 2004308454 A.*
Aug. 16, 2011 International Search Report issued in International Patent Application No. PCT/IB2011/000939.
Aug. 16, 2011 Written Opinion of the International Searching Authority issued in International Patent Application No. PCT/IB2011/000939.

* cited by examiner

*Primary Examiner* — Thomas Denion
*Assistant Examiner* — Jason Shanske
(74) *Attorney, Agent, or Firm* — Oliff PLC

(57) ABSTRACT

An abnormality detection apparatus for a particulate filter that is provided in an exhaust system of an internal combustion engine and traps particulate matter in exhaust gas. The abnormality detection apparatus includes: a sensor that is provided downstream of the particulate filter and detects the particulate matter; a removal device that removes the particulate matter trapped in the particulate filter based on an output of the sensor; and a determination device that determines whether the particulate filter is in an abnormal state based on a first stabilization time that has elapsed until the output of the sensor becomes stable after completion of removal of the particulate matter performed by the removal device.

11 Claims, 5 Drawing Sheets

ABNORMALITY DETECTION APPARATUS FOR PARTICULATE FILTER

INCORPORATION BY REFERENCE

The disclosure of Japanese Patent Application No. 2010-113439 filed on May 17, 2010, including the specification, drawings and abstract is incorporated herein by reference in its entirety.

BACKGROUND OF THE INVENTION

1. Field of the Invention

The invention relates to an abnormality detection apparatus for an exhaust gas control apparatus.

2. Description of the Related Art

For example, as an exhaust gas control apparatus, a Diesel Particulate Filter (DPF) that traps particulate matter (PM) contained in exhaust gas of a diesel engine is known, and an abnormality detection apparatus that detects an abnormality of a DPF is known. For example, an apparatus is known which detects an abnormality of a DPF based on the pressure difference across the DPF (for example, refer to Japanese Patent Application Publication No, 2009-215926).

The abnormality detection apparatus described above, however, may fail to perform the abnormality detection properly when the concentration of PM in exhaust gas is low and thus the change in the exhaust gas pressure difference across the DPF is small. Meanwhile, a method may be used in which whether a DPF is in an abnormal state is determined by directly measuring PM using a sensor. In this method, however, the output value of the sensor is small when the concentration of PM in exhaust gas is low, and therefore, in such a case, the abnormality detection may not be properly performed.

SUMMARY OF THE INVENTION

In view of the problem described above, the invention has been made to provide an abnormality detection apparatus for an exhaust gas control apparatus, which detects an abnormality of the exhaust gas control apparatus with an improved accuracy.

An aspect of the invention relates to an abnormality detection apparatus for an exhaust gas control apparatus that is provided in an exhaust system of an internal combustion engine and traps particulate matter in exhaust gas. The abnormality detection apparatus includes: a sensor that is provided downstream of the exhaust gas control apparatus and detects the particulate matter; a removal device that removes the particulate matter trapped in the exhaust gas control apparatus based on an output of the sensor; and a determination device that determines whether the exhaust gas control apparatus is in an abnormal state based on a first stabilization time that has elapsed until the output of the sensor becomes stable after completion of removal of the particulate matter performed by the removal device.

The abnormality detection apparatus described above may be such that the determination device determines that the exhaust gas control apparatus is not in an abnormal state if the first stabilization time is shorter than a first reference stabilization time, and determines that the exhaust gas control apparatus is in an abnormal state if the first stabilization time is equal to or longer than the first reference stabilization time.

The abnormality detection apparatus described above may be such that the determination device determines that the exhaust gas control apparatus is not in an abnormal state and the particulate matter has not been removed sufficiently if the first stabilization time is shorter than a second reference stabilization time that is shorter than the first reference stabilization time.

The abnormality detection apparatus described above may be such that the determination device determines that the sensor is in an abnormal state if an output of the sensor at the time when the output of the sensor becomes stable is smaller than a reference output.

The abnormality detection apparatus described above may be such that, when an aging process for the exhaust gas control apparatus is executed at the time of shipping, the determination device finishes the aging process if a second stabilization time that has elapsed until the output of the sensor becomes stable after start of the aging process is shorter than a third reference stabilization time, and continues the aging process if the second stabilization time is equal to or longer than the third reference stabilization time.

The abnormality detection apparatus described above may be such that the first reference stabilization time, the second reference stabilization time, and the reference output are set based on a PM production amount predicted value that has been set in accordance with an operation condition of the internal combustion engine. The abnormality detection apparatus described above may be such that the first reference stabilization time, the second reference stabilization time, and the reference output are set greater, as the PM production amount predicted value becomes larger.

Thus, the abnormality detection apparatus of the invention detects an abnormality of an exhaust gas control apparatus with an improved accuracy.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
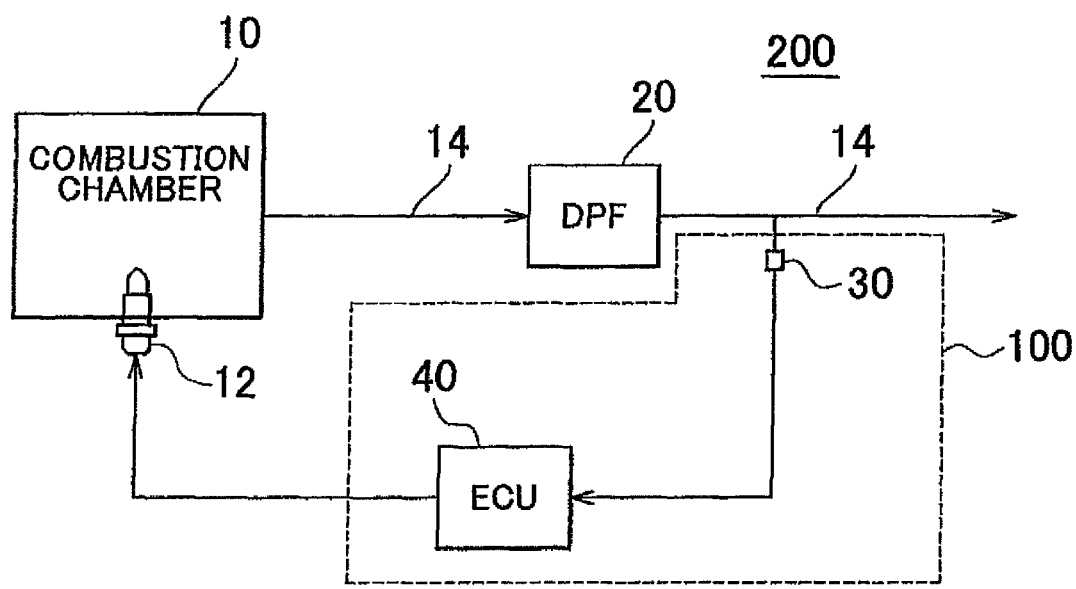
FIG. 1 is a view showing the structure of the abnormality detection apparatus of the first example embodiment.

FIG. 1 shows the structure of an abnormality detection apparatus 100 of the first example embodiment and the structure of an internal combustion engine 200. The arrow 14 in FIG. 1 indicates the flow of exhaust gas. A Diesel Particulate Filter (DPF) 20 is provided in an exhaust passage provided downstream of a combustion chamber 10. A PM sensor 30 is provided downstream of the DPF 20. An injector 12 for supplying fuel is provided at the combustion chamber 10.

The DPF 20 is a device that traps the PM contained in the exhaust gas discharged from the combustion chamber 10 and then removes the trapped PM, and the DPF 20 may be regarded as "exhaust gas control apparatus" in the invention. The main component of PM is unburned carbon, and PM also contains SOx and various metal components. The DPF 20 is a structure that has, for example, a honeycomb structure and has an upstream portion and a downstream portion that are separated from each other by a filtering wall. As exhaust gas passes through the filtering wall, the PM contained in the exhaust gas is adsorbed to the filtering wall.

The PM sensor 30 is a sensor that detects the PM in the exhaust gas that has passed through the DPF 20, and the PM sensor 30 may be regarded as "sensor" in the invention. The PM sensor 30 is used to obtain a cumulative value of the PM discharged to the downstream side of the DPF 20.

The ECU 40 obtains, from the outputs of the PM sensor 30, the cumulative value of the PM discharged to the downstream side of the DPF 20 (will hereinafter be referred to as "cumulative PM value" where necessary). The ECU 40 serves as "determining means" for determining whether the DPF 20 is in an abnoiinal state based on the output of the PM sensor 30.

Further, the ECU 40" executes operation control of the internal combustion engine 200 based on the output of the PM sensor 30 and predetermined operation conditions. The operation control of the internal combustion engine 200 includes, for example, control of fuel injection amount (i.e., the amount of fuel to be supplied to the combustion chamber 10) and fuel injection timing. The ECU 40 executes the fuel injection control by controlling the injector 12 provided at the combustion chamber 10. It is to be noted that the injector 12 may either be provided at the combustion chamber 10 as in the first example embodiment or at the intake system (e.g., the intake port) corresponding to the combustion chamber 10.

When the cumulative PM value has become larger than a predetermined value, the ECU 40 executes a process of recovering the DPF 20 by removing the PM accumulated in the DPF 20. The DPF 20 can be recovered by, for example, supplying fuel to the exhaust system so that the exhaust gas temperature increases and thus the PM adhered to the DPF 20 is combusted and thereby removed. Thus, the ECU 40 serves also as "removing means" for removing the PM trapped in the DPF 20. It is to be noted that the removal of PM may be accomplished using various methods other than described above.

Figure 2A:
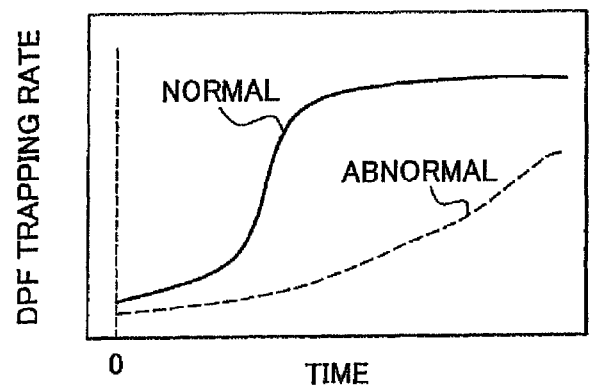
FIG. 2A is a graph illustrating how the DPF trapping rate changes over time immediately after the DPF has been recovered.
Figure 2B:
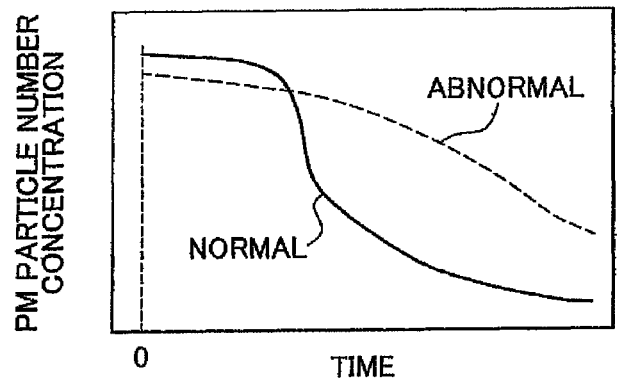
FIG. 2B is a graph illustrating how the particle number concentration of PM changes over time immediately after the DPF has been recovered.
Figure 2C:
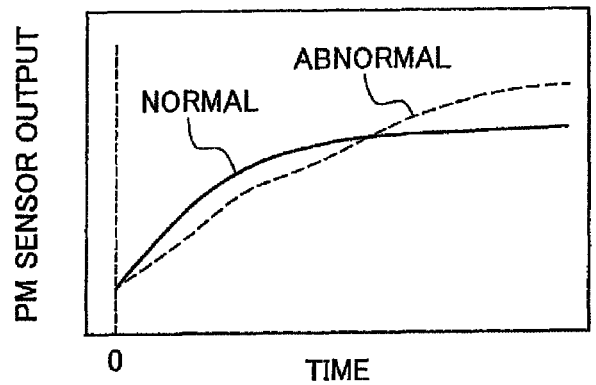
FIG. 2C is a graph illustrating how the output of the PM sensor changes over time immediately after the DPF has been recovered.

FIGS. 2A to 2C are graphs each illustrating how the value of a related parameter changes immediately after the recovery of the DPF 20. More specifically, the parameter in FIG. 2A is a DPF trapping rate, the parameter in FIG. 2B is the particle number concentration of PM, and the parameter in FIG. 2C is the output of the PM sensor 30. The DPF trapping rate indicates the ratio of the amount of the PM trapped by the filtering wall of the DPF 20 to the amount of the PM flowing into the DPF 20, and the DPF trapping rate is calculated from, for example, values obtained from PM analyzers that are disposed upstream and downstream of the DPF 20. The particle number concentration of PM indicates the concentration of the PM contained in the exhaust gas that has passed through the DPF 20 (i.e., the number of particles of the PM per unit volume), and for example, the particle number concentration of PM is directly measured by emitting laser beams to PM. In each of the graphs in FIGS. 2A to 2C, the horizontal axis represents time, and the time "0" represents the time at which the recovery of the DPF 20 is completed (i.e., the time at which to start the calculation or measurement of each parameter). Further, in each of the graphs in FIGS. 2A to 2C, the solid curve represents the value of the parameter that is obtained when the DPF 20 is in a normal state, and the dotted curve represents the value of the parameter that is obtained when the DPF 20 is in an abnormal state. In the following descriptions, the cases where the DPF 20 is in a normal state will be simply referred to as "in a normal case" where necessary, and the cases where the DPF 20 is in an abnormal state will be simply referred to as "an abnormal case" where necessary.

Referring to FIG. 2A, the trapping rate at the DPF 20 is low immediately after the recovery of the DPF 20 (i.e., in a state where almost no PM has been trapped in the DPF 20) both in a normal case and an abnormal case. In a normal case, that is, in a case where the DPF 20 is in a normal state, the DPF trapping rate sharply increases after time elapses and PM starts to adhere to the DPF 20, and then the DPF trapping rate stays at a constant level. On the other hand, in an abnormal case, that is, in a case where the DPF 20 is in an abnormal state, the DPF trapping rate does not become stable despite of elapse of time. This is because, for example, the DPF trapping rate does not increase rapidly due to an abnormality of the structure in the DPF 20.

Referring to FIG. 2B, the particle number concentration of PM on the downstream side of the DPF 20 is high immediately after the recovery of the DPF 20 both in a normal case and an abnormal case. In a normal case, that is, in a case where the DPF 20 is in a normal state, the particle number concentration of PM sharply decreases after time elapses and PM starts to adhere to the DPF 20. On the other hand, in an abnormal case, that is, in a case where the DPF 20 is in an abnormal state, the particle number concentration of PM does not decrease rapidly despite of elapse of time.

Referring to FIG. 2C, the output of the PM sensor 30 starts to increase immediately after the recovery of the DPF 20 and continues to increase as time passes both in a normal case and an abnormal case. Then, in a normal case, that is, in a case where the DPF 20 is in a normal state, the output of the PM sensor 30 becomes stable when a time t1 has elapsed after the recovery of the DPF 20. On the other hand, in an abnormal case, that is, in a case where the DPF 20 is in an abnormal state, the elapsed time until the output of the PM sensor 30 becomes stable (i.e., time t2) is longer than the time t1 that elapses until the output of the PM sensor 30 becomes stable in a normal case. In the first example embodiment, based on the findings described above, it is determined whether the DPF 20 is in an abnormal state using the time from when the recovery of the DPF 20 is completed to when the output of the PM sensor 30 becomes stable (the time will hereinafter be referred to as "stabilization time t").

Figure 3:
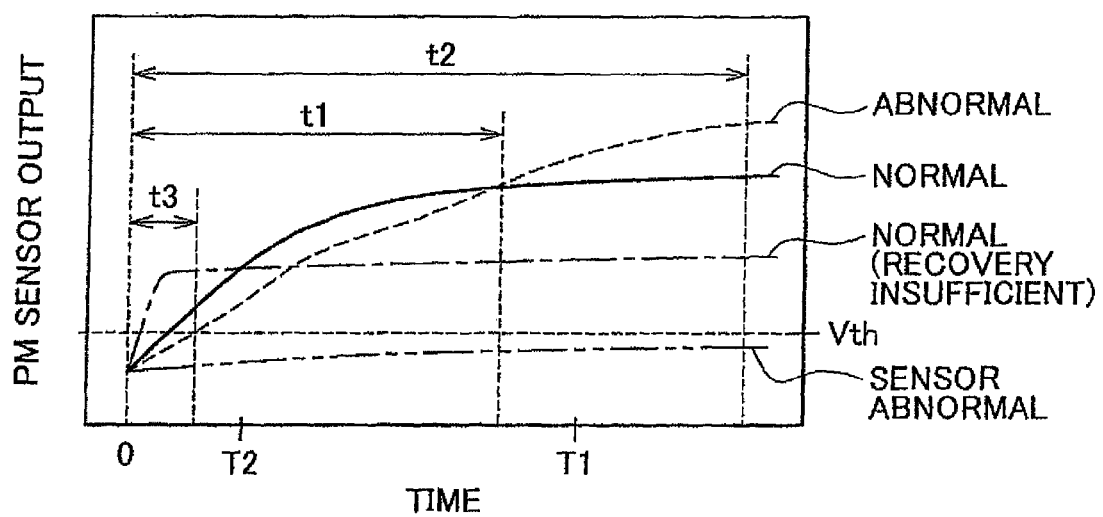
FIG. 3 is a graph illustrating determination thresholds used in an abnormality detection operation.

FIG. 3 is a graph illustrating determination thresholds used in an abnormality detection operation. In FIG. 3, the solid curve represents the output of the PM sensor 30 that is obtained when the DPF 20 is in a normal state, and the dotted curve represents the output of the PM sensor 30 that is obtained when the DPF 20 is in an abnormal state. FIG. 3 also shows the output of the PM sensor 30 that is obtained when the DPF 20 is in a normal state but has not been recovered sufficiently, and the output of the PM sensor 30 that is obtained when the PM sensor 30 is in an abnormal state. As mentioned earlier, the stabilization time t2 in a case where the DPF 20 is in an abnormal state is longer than the stabilization time t1 in a case where the DPF 20 is in a normal state. Thus, in order to distinguish between these two states, a determination threshold that is larger (longer) than t1 but smaller (shorter) than t2 is used. This determination threshold will hereinafter be referred to as "first reference stabilization time T1".

If the time that has elapsed until the output of the PM sensor 30 becomes stable after the recovery of the DPF 20 is significantly short (refer to "t3" in FIG. 3), it is considered that the DPF 20 is in a normal state but PM has not been removed sufficiently (insufficient recovery). Therefore, a determination threshold that is larger (longer) than t3 but smaller (shorter) than t1 is used in order to distinguish between the case where the DPF 20 is in a normal state and the DPF 20 has been recovered sufficiently and the case where the DPF 20 is in a normal state but the DPF 20 has not been recovered sufficiently. This determination threshold will hereinafter be referred to as "second reference stabilization time T2". The second reference stabilization time T2 is always shorter than the first reference stabilization time T1.

If the output of the PM sensor 30 (will hereinafter be referred to as "output v" where necessary) is significantly small, it is considered that the PM sensor 30 is in an abnormal state. For this reason, a threshold for determining whether the PM sensor 30 is in an abnormal state is used. This threshold will hereinafter be referred to as "reference output Vth". More specifically, whether the PM sensor 30 is in an abnormal state is determined by comparing the output v of the PM sensor 30 with the reference output Vth.

Figure 4:
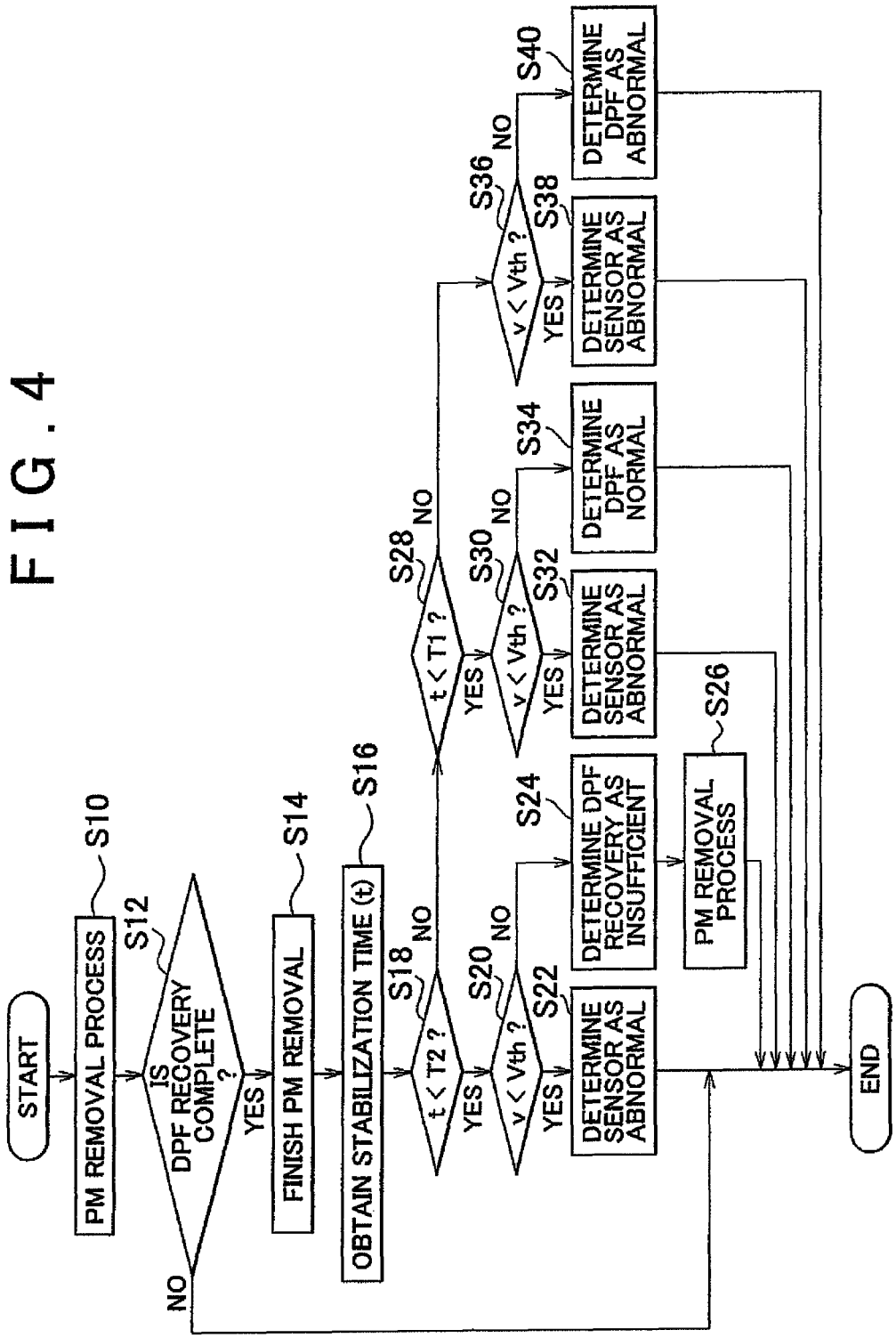
FIG. 4 is a flowchart illustrating the operation of the abnormality detection apparatus of the first example embodiment.

FIG. 4 is a flowchart illustrating the operation of the abnormality detection apparatus of the first example embodiment. Referring to FIG. 4, first, the ECU 40, which is a removal device serving as "removing means", executes a PM removal process (recovery process) for the DPF 20 (step S10). Next, the ECU 40 determines whether the recovery process for the DPF 20 has been completed (step S12). If yes, the ECU 40 finishes the PM removal process (step S14).

Next, the ECU 40, which is a determination device serving as "determining means", obtains the stabilization time t that has elapsed until the output of the PM sensor 30 becomes stable after the completion of the PM removal process described above (step S16). Note that "the output of the PM sensor 30 becomes stable" means that the change in the output of the PM sensor 30 becomes extremely small. Whether the output of the PM sensor 30 has become stable can be determined by, for example, obtaining the amount of change in the output of the PM sensor 30 that has occurred over a predetermined period of time (i.e., a differential value) and then determining whether the obtained amount is smaller than a predetermined value. It is to be noted that the determination as to whether the output of the PM sensor 30 has become stable may be accomplished using various methods other than described above.

Next, the ECU 40 compares the stabilization time t, which has been obtained in step S16, with the second reference stabilization time T2, which is a predetermined value (step S18). If the stabilization time t is shorter than the second reference stabilization time T2, the ECU 40 compares the output v of the PM sensor 30 with the reference output Vth (step S20). If the output v of the PM sensor 30 is smaller than the reference output Vth, the ECU 40 determines that the PM sensor 30 is in an abnormal state (step S22). On the other hand, if the output v of the PM sensor 30 is equal to or larger than the reference output Vth, the ECU 40 determines that the DPF 20 has not been recovered sufficiently (step S24), and then executes the PM removal process again (step S26).

If it is determined in step S18 that the stabilization time t is equal to or longer than the second reference stabilization time T2, the ECU 40 compares the stabilization time t, which has been obtained in step S16, with the first reference stabilization time T1, which is a predetermined value (step S28). If the stabilization time t is shorter than the first reference stabilization time T1, the ECU 40 then compares the output v of the PM sensor 30 with the reference output Vth (step S30). If the output v of the PM sensor 30 is smaller than the reference output Vth, the ECU 40 determines that the PM sensor 30 is in an abnormal state (step S32). On the other hand, if the output v of the PM sensor 30 is equal to or larger than the reference output Vth, the ECU 40 determines that the DPF 20 is in a normal state (step S34).

If it is determined in step S28 that the stabilization time t is equal to or longer than the first reference stabilization time T1, the ECU 40 compares the output v of the PM sensor 30 with the reference output Vth (step S36). If the output v of the PM sensor 30 is smaller than the reference output Vth, the ECU 40 determines that the PM sensor 30 is in an abnormal state (step S38). On the other hand, if the output v of the PM sensor 30 is equal to or larger than the reference output Vth, the ECU 40 determines that the DPF 20 is in an abnormal state (step S40).

According to the abnormality detection apparatus 100 of the first example embodiment, as described above, the ECU 40 determines whether the DPF 20 is in an abnormal state based on the stabilization time t, that is, the time that has elapsed until the output v of the PM sensor 30 becomes stable after the completion of the PM removal process for the DPF 20. Thus, an abnormality of the DPF 20 can be accurately detected even when the concentration of PM in exhaust gas is low and the output of the PM sensor 30 is small.

More specifically, whether the DPF 20 is in a normal state or in an abnormal state can be determined by comparing the stabilization time t with the first reference stabilization time T1, whether the DPF 20 has been recovered sufficiently or insufficiently (i.e., whether the PM removal process has been performed sufficiently or insufficiently) can be determined by comparing the stabilization time t with the second reference stabilization time T2, and whether the PM sensor 30 is in an abnormal state can be determined by comparing the reference output Vth with the output v of the PM sensor 30 at the time when it becomes stable.

Each of the first reference stabilization time T1, the second reference stabilization time T2, and the reference output Vth may be set to any value. However, preferably, these determination thresholds are set based on the amount of PM that is predicted to be produced (will hereinafter be referred to as "PM production amount predicted value"). In such a case, preferably, the PM production amount predicted value is set in accordance with given operation conditions. In such a case, preferably, the larger the PM production amount predicted value becomes, the greater the first reference stabilization time T1, the second reference stabilization time T2, and the reference output Vth are made. By doing so, it is possible to further increase the accuracy in detecting an abnormality of the DPF 20 and an abnormity of the PM sensor 30.

Next, an abnormality detection apparatus of the second example embodiment of the invention will be described. In the second example embodiment, the abnormality detection apparatus of the first example embodiment is adapted for determination as to whether to finish an aging process that is executed at the time of shipping. At the time of shipping, no PM is accumulated in the DPF 20, and thus the DPF trapping rate is low. Therefore, a process is needed which causes accumulation of PM in the DPF 20 by operating the internal combustion engine 200 for a predetermined period of time. This process will hereinafter be referred to as "aging process".

Figure 5:
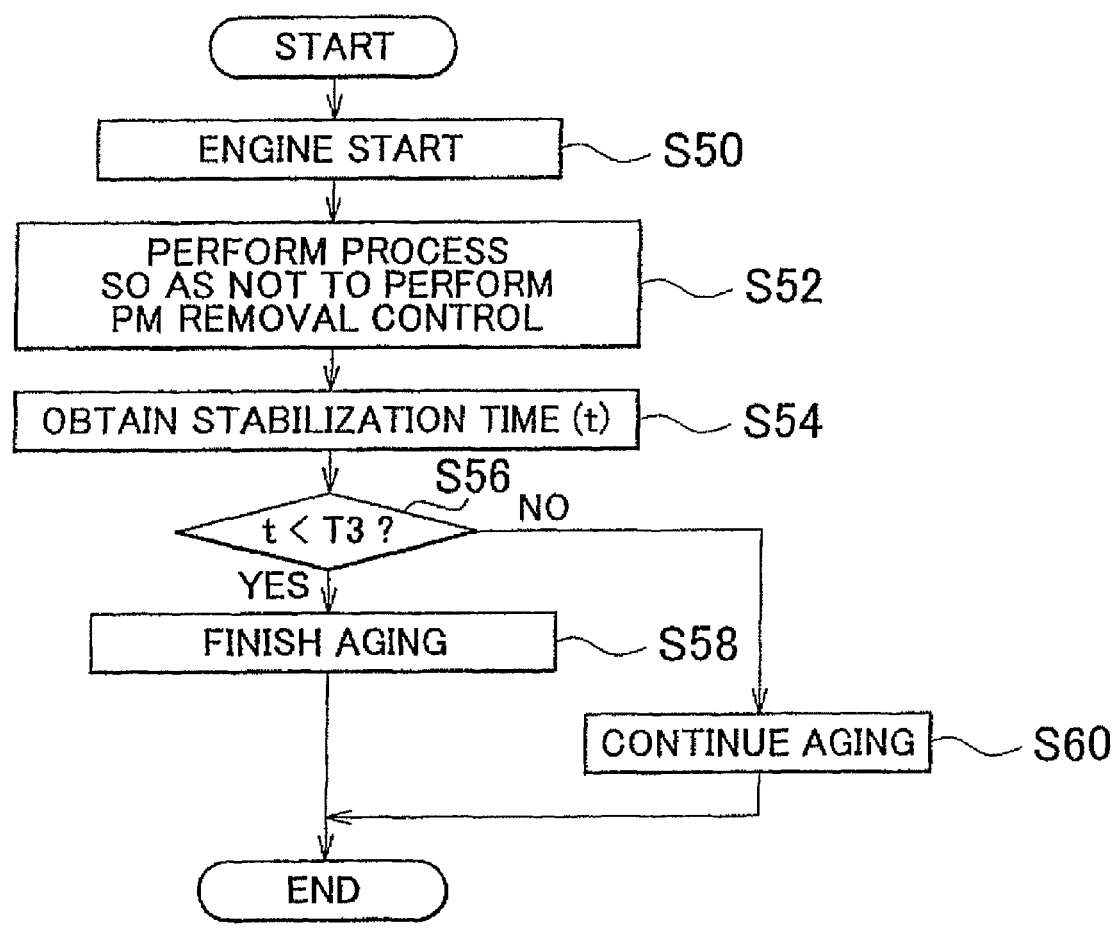
FIG. 5 is a flowchart illustrating the operation of the abnormality detection apparatus of the second example embodiment.

FIG. 5 is a flowchart illustrating the operation of the abnormality detection apparatus of the second example embodiment. Referring to FIG. 5, first, the ECU 40 starts the internal combustion engine 200 (step S50). In addition, the ECU 40 performs a process so as not to perform the PM removal control for the DPF 20 (step S52). Then, as in the first example embodiment, the ECU 40 obtains the stabilization time t, that is, the time that has elapsed until the output of the PM sensor 30 becomes stable after the engine start in step S50 (step S54).

Next, the ECU 40 compares the stabilization time t, which has been obtained in step S54, with a third reference stabilization time T3, which is a predetermined value (step S56). If the stabilization time t is shorter than the third reference stabilization time T3, the ECU 40 determines that the aging process for the DPF 20 has been performed sufficiently, and thus finishes, the aging process (step S58). On the other hand, if the stabilization time t is equal to or longer than the third reference stabilization time T3, the ECU 40 determines that the aging process for the DPF 20 has not yet been performed sufficiently, and thus continues the aging process (step S60).

Thus, the abnormality detection apparatus of the second example embodiment, which is identical in configuration to the abnormality detection apparatus of the first example embodiment, determines whether to finish the aging process that is executed at the time of shipping. More specifically, if the stabilization time, that is, the time that has elapsed until the output of the PM sensor 30 becomes stable after the start of the aging process is shorter than a predetermined time, it is determined that the aging is sufficient. On the other hand, if the stabilization time is equal to or longer than the predetermined time, it is determined that the aging is still insufficient. It is to be noted that, in this specification, the stabilization time in the first example embodiment (will be referred to as "first stabilization time") and the stabilization time in the second example embodiment (will be referred to as "second stabilization time") are distinguished from each other, and further, the reference stabilization times in the first example embodiment (the first reference stabilization time T1 and the second reference stabilization time T2) and the reference stabilization time in the second example embodiment (the third reference stabilization time T3) are distinguished from each other.

While the invention has been described with reference to the example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention. For example, while the invention has been embodied as an abnormality detection apparatus for an exhaust gas control apparatus used in diesel engines in each of the foregoing example embodiments, the applications of the invention are not limited to diesel engines. That is, the invention may be embodied as an abnormality detection apparatus for an exhaust gas control apparatus used in various other internal combustion engines, such as gasoline engines.

What is claimed is:

1. An abnormality detection apparatus for a particulate filter that is provided in an exhaust system of an internal combustion engine and traps particulate matter in exhaust gas, the abnormality detection apparatus comprising:
a sensor that is provided downstream of the particulate filter and detects the particulate matter;
a removal device that removes the particulate matter trapped in the particulate filter, based on an output of the sensor; and
a determination device that determines whether the particulate filter is in an abnormal state, based on a first stabilization time that has elapsed until the output of the sensor becomes stable after completion of removal of the particulate matter performed by the removal device.

2. The abnormality detection apparatus according to claim 1, wherein the determination device determines that the particulate filter is not in an abnormal state if the first stabilization time is shorter than a first reference stabilization time, and determines that the particulate filter is in an abnormal state if the first stabilization time is equal to or longer than the first reference stabilization time.

3. The abnormality detection apparatus according to claim 2, wherein the first reference stabilization time is set based on a PM production amount predicted value that has been set in accordance with an operation condition of the internal combustion engine.

4. The abnormality detection apparatus according to claim 3, wherein the first reference stabilization time is set longer, as the PM production amount predicted value becomes larger.

5. The abnormality detection apparatus according to claim 2, wherein the determination device determines that the particulate filter is not in an abnormal state and the particulate matter has not been removed sufficiently if the first stabilization time is shorter than a second reference stabilization time that is shorter than the first reference stabilization time.

6. The abnormality detection apparatus according to claim 5, wherein the first reference stabilization time and the second reference stabilization time are set based on a PM production amount predicted value that has been set in accordance with an operation condition of the internal combustion engine.

7. The abnormality detection apparatus according to claim 6, wherein the first reference stabilization time and the second reference stabilization time are set longer, as the PM production amount predicted value becomes larger.

8. The abnormality detection apparatus according to claim 1, wherein the determination device determines that the sensor is in an abnormal state if an output of the sensor at the time when the output of the sensor becomes stable is smaller than a reference output.

9. The abnormality detection apparatus according to claim 8, wherein the reference output is set based on a PM production amount predicted value that has been set in accordance with an operation condition of the internal combustion engine.

10. The abnormality detection apparatus according to claim 9, wherein the reference output is set larger, as the PM production amount predicted value becomes larger.

11. The abnormality detection apparatus according to claim 2, wherein when an aging process for the particulate filter is executed at the time of shipping, the determination device finishes the aging process if a second stabilization time that has elapsed until the output of the sensor becomes stable after start of the aging process is shorter than a third reference stabilization time, and continues the aging process if the second stabilization time is equal to or longer than the third reference stabilization time.

* * * * *